United States Patent
Kim et al.

(10) Patent No.: US 12,368,570 B2
(45) Date of Patent: Jul. 22, 2025

(54) APPARATUS AND METHOD WITH HOMOMORPHIC ENCRYPTION OPERATION

(71) Applicant: SAMSUNG ELECTRONICS CO., LTD., Suwon-si (KR)

(72) Inventors: Andrey Kim, Suwon-si (KR); Yongwoo Lee, Suwon-si (KR); Maksim Deriabin, Suwon-si (KR); Jieun Eom, Suwon-si (KR); Rakyong Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 256 days.

(21) Appl. No.: 18/316,062

(22) Filed: May 11, 2023

(65) Prior Publication Data

US 2024/0129106 A1   Apr. 18, 2024

(30) Foreign Application Priority Data

Oct. 4, 2022  (KR) .................. 10-2022-0126564
Dec. 8, 2022  (KR) .................. 10-2022-0170614

(51) Int. Cl.
| | |
|---|---|
| H04L 9/06 | (2006.01) |
| H04L 9/00 | (2022.01) |
| H04L 9/08 | (2006.01) |
| H04L 9/40 | (2022.01) |

(52) U.S. Cl.
CPC ............ *H04L 9/008* (2013.01); *H04L 9/0618* (2013.01)

(58) Field of Classification Search
CPC ..... H04L 9/008; H04L 9/0618; H04L 9/0825; H04L 9/40
See application file for complete search history.

(56) References Cited

U.S. PATENT DOCUMENTS

| | | | |
|---|---|---|---|
| 10,778,409 B2* | 9/2020 | Cheon ................... | H04L 9/3093 |
| 2021/0399874 A1* | 12/2021 | Polyakov ................ | H04L 9/085 |
| 2022/0376890 A1 | 11/2022 | Eom et al. | |
| 2022/0385461 A1 | 12/2022 | Eom et al. | |

(Continued)

FOREIGN PATENT DOCUMENTS

| | | |
|---|---|---|
| EP | 4 195 577 A1 | 6/2023 |
| KR | 10-2349855 B1 | 1/2022 |
| KR | 10-2022-0120410 A | 8/2022 |

OTHER PUBLICATIONS

Kim, Andrey, et al. "General Bootstrapping Approach for RLWE-Based Homomorphic Encryption." IEEE Transactions on Computers, 2023, (28 pages).

(Continued)

*Primary Examiner* — Vu V Tran
(74) *Attorney, Agent, or Firm* — NSIP Law

(57) ABSTRACT

An apparatus with a homomorphic encryption operation includes: one or more processors configured to: generate a modified vector by preprocessing vector components of an operand ciphertext of a blind rotation operation based on an order of a polynomial of an output ciphertext of the blind rotation operation and a modulus of the operand ciphertext; and generate a homomorphic encryption operation result by performing the blind rotation operation based on a public key for performing the blind rotation operation and the modified vector.

21 Claims, 8 Drawing Sheets

(56) References Cited

U.S. PATENT DOCUMENTS

| | | |
|---|---|---|
| 2023/0171085 A1 | 6/2023 | Lee et al. |
| 2023/0246807 A1 | 8/2023 | Lee et al. |
| 2024/0259180 A1* | 8/2024 | Joye .................. H04L 9/008 |

OTHER PUBLICATIONS

Extended European search report issued on Feb. 12, 2024, in counterpart European Patent Application No. 23192922.5 (6 pages).

Ducas et al. "FHEW: Bootstrapping Homomorphic Encryption in less than a second" *Advances in Cryptology—Eurocrypt 2015: 34th Annual International Conference on the Theory and Applications of Cryptographic Techniques, Sofia, Bulgaria*, Apr. 26-30, 2015, Proceedings, Part I 34. Springer Berlin Heidelberg, 2015 (pp. 1-18).

Chillotti et al. "TFHE: Fast Fully Homomorphic Encryption over the Torus*" *Journal of Cryptology* vol. 33 No. 1, Jan. 2020 (pp. 1-62).

Lee et al. "Efficient FHEW Bootstrapping with Small Evaluation Keys, and Applications to Threshold Homomorphic Encryption" *Advances in Cryptology—Eurocrypt 2023: 42nd Annual International Conference on the Theory and Applications of Cryptographic Techniques, Lyon, France*. Oct. 11, 2022 (pp. 1-28).

Micciancio et al. "Bootstrapping in FHEW-like Cryptosystems" *Proceedings of the 9th on Workshop on Encrypted Computing & Applied Homomorphic Cryptography* Oct. 23, 2022 (pp. 1-27).

* cited by examiner

APPARATUS AND METHOD WITH HOMOMORPHIC ENCRYPTION OPERATION

CROSS-REFERENCE TO RELATED APPLICATIONS

This application claims the benefit under 35 USC § 119(a) of Korean Patent Application No. 10-2022-0126564, filed on Oct. 4, 2022, and Korean Patent Application No. 10-2022-0170614, filed on Dec. 8, 2022, in the Korean Intellectual Property Office, the entire disclosures of which are incorporated herein by reference for all purposes.

BACKGROUND

1. Field

The following description relates to an apparatus and method with a homomorphic encryption operation.

2. Description of Related Art

Homomorphic encryption is an encryption method that enables arbitrary operations between encrypted data. Utilizing homomorphic encryption may enable arbitrary operations on encrypted data without decrypting the encrypted data, and homomorphic encryption may be lattice-based and thus resistant to quantum algorithms and safe.

A blind rotation operation technology may be used to perform arbitrary function operations on ciphertext messages in the homomorphic encryption and provide high accuracy for operation results, but may have a disadvantage in that the size of a public key is significantly large.

A blind rotation operation may require a lot of memory, and the amount of computation may greatly increase when the size of a public key necessary for a homomorphic encryption operation is reduced.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one or more general aspects, an apparatus with a homomorphic encryption operation includes: one or more processors configured to: generate a modified vector by preprocessing vector components of an operand ciphertext of a blind rotation operation based on an order of a polynomial of an output ciphertext of the blind rotation operation and a modulus of the operand ciphertext; and generate a homomorphic encryption operation result by performing the blind rotation operation based on a public key for performing the blind rotation operation and the modified vector.

The public key may include a blind rotation key, an automorphism key, and a key-switching key.

The public key may be generated based on the modified vector and a secret key.

For the generating of the modified vector, the one or more processors may be configured to: compare the modulus and the order of the output ciphertext; and generate the modified vector based on a result of the comparing.

For the generating of the modified vector, the one or more processors may be configured to: generate a first set based on a portion of the vector components of the operand ciphertext; and generate the modified vector based on a second set, wherein the first set and the second set are disjoint.

For the generating of the homomorphic encryption operation result, the one or more processors may be configured to: determine, in response to a generator of the vector components of the operand ciphertext being unique, a loop index based on the generator; and perform the blind rotation operation based on the loop index.

For the generating of the homomorphic encryption operation result, the one or more processors may be configured to: perform a first blind operation based on a first set of the operand ciphertext; and perform a second blind operation based on a second set of the operand ciphertext.

For the generating of the homomorphic encryption operation result, the one or more processors may be configured to perform the blind rotation operation by performing an increment operation, an automorphism operation, and a key switching operation based on the modified vector.

For the generating of the homomorphic encryption operation result, the one or more processors may be configured to: determine a number of odd numbers and a number of even numbers in the vector components of the operand ciphertext; and add "1" to the vector components of the operand ciphertext based on a result of comparing the number of odd numbers and the number of even numbers.

For the generating of the homomorphic encryption operation result, the one or more processors may be configured to, in response to the vector components of the operand ciphertext being even, perform the blind rotation operation based on a blind rotation key based on vector components of a secret key of the public key, a negative sum of the vector components of the secret key, and a sum of consecutive vector components among the vector components of the secret key.

The apparatus may include a receiver configured to receive the public key and the operand ciphertext.

In one or more general aspects, a processor-implemented method with a homomorphic encryption operation includes: generating a modified vector by preprocessing vector components of an operand ciphertext of a blind rotation operation based on an order of a polynomial of an output ciphertext of the blind rotation operation and a modulus of the operand ciphertext; and generating a homomorphic encryption operation result by performing the blind rotation operation on the modified vector based on a public key for performing the blind rotation operation.

The public key may include a blind rotation key, an automorphism key, and a key-switching key.

The public key is generated based on the modified vector and a secret key.

15. The method of claim 12, wherein the generating of the modified vector may include: comparing the modulus and the order of the output ciphertext; and generating the modified vector based on a result of the comparing.

The generating of the modified vector may include: generating a first set based on a portion of the vector components of the operand ciphertext; and generating the modified vector based on a second set, wherein the first set and the second set are disjoint.

The generating of the homomorphic encryption operation result may include: determining, in response to a generator of the vector components of the operand ciphertext being unique, a loop index based on the generator; and performing the blind rotation operation based on the loop index.

The generating of the homomorphic encryption operation result may include: performing a first blind operation based on a first set of the operand ciphertext; and performing a second blind operation based on a second set of the operand ciphertext.

The generating of the homomorphic encryption operation result may include performing the blind rotation operation by performing an increment operation, an automorphism operation, and a key switching operation based on the modified vector.

The generating of the homomorphic encryption operation result may include: determining a number of odd numbers and a number of even numbers in the vector components of the operand ciphertext; and adding "1" to the vector components of the operand ciphertext based on a result of comparing the number of odd numbers and the number of even numbers.

The generating of the homomorphic encryption operation result may include performing, in response to the vector components of the operand ciphertext being even, the blind rotation operation based on a blind rotation key based on vector components of a secret key of the public key, a negative sum of the vector components of the secret key, and a sum of consecutive vector components among the vector components of the secret key.

Other features and aspects will be apparent from the following detailed description, the drawings, and the claims.

Figure 1:
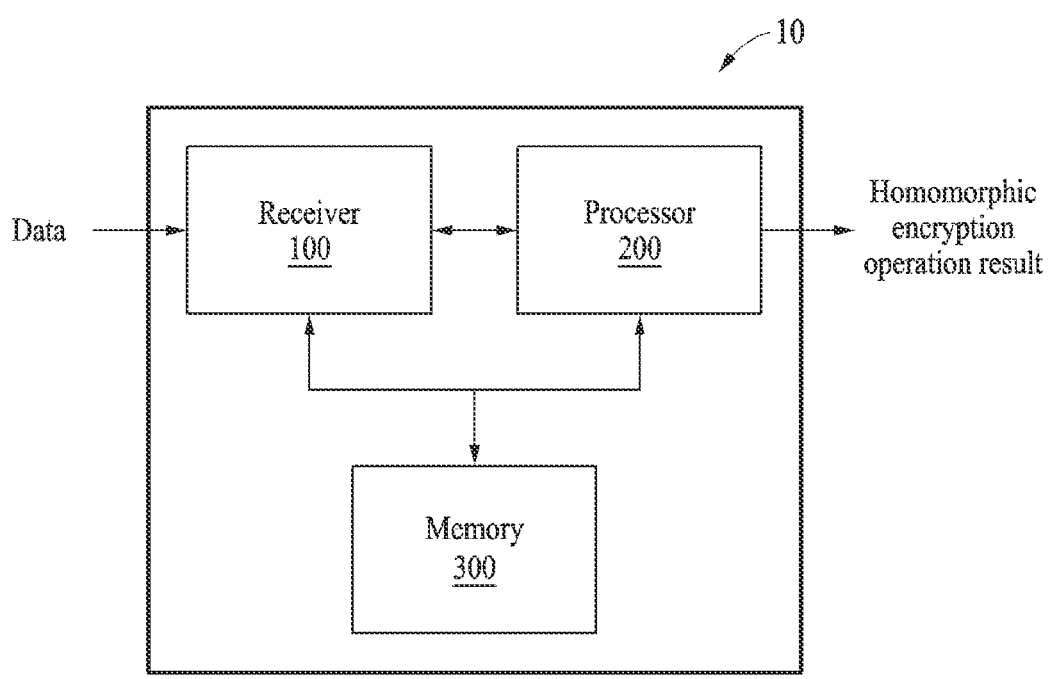
FIG. 1 illustrates an example of a homomorphic encryption operation apparatus.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

Hereinafter, examples will be described in detail with reference to the accompanying drawings. However, various alterations and modifications may be made to the examples. Here, the examples are not construed as limited to the disclosure. The examples should be understood to include all changes, equivalents, and replacements within the idea and the technical scope of the disclosure.

The terminology used herein is for the purpose of describing particular examples only and is not to be limiting of the examples. The singular forms "a", "an", and "the" are intended to include the plural forms as well, unless the context clearly indicates otherwise. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms including technical and scientific terms used herein have the same meaning as commonly understood by one of ordinary skill in the art to which this disclosure pertains and based on an understanding of the disclosure of the present application. It will be further understood that terms, such as those defined in commonly-used dictionaries, should be interpreted as having a meaning that is consistent with their meaning in the context of the relevant art and the disclosure of the present application and will not be interpreted in an idealized or overly formal sense unless expressly so defined herein.

When describing the examples with reference to the accompanying drawings, like reference numerals refer to like constituent elements and a repeated description related thereto will be omitted. In the description of examples, detailed description of well-known related structures or functions will be omitted when it is deemed that such description will cause ambiguous interpretation of the present disclosure.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Throughout the specification, when a component or element is described as being "on", "connected to," "coupled to," or "joined to" another component, element, or layer it may be directly (e.g., in contact with the other component or element) "on", "connected to," "coupled to," or "joined to" the other component, element, or layer or there may reasonably be one or more other components, elements, layers intervening therebetween. When a component or element is described as being "directly on", "directly connected to," "directly coupled to," or "directly joined" to another component or element, there can be no other elements intervening therebetween. Likewise, expressions, for example, "between" and "immediately between" and "adjacent to" and "immediately adjacent to" may also be construed as described in the foregoing.

As used herein, the term "and/or" includes any one and any combination of any two or more of the associated listed items. The phrases "at least one of A, B, and C", "at least one of A, B, or C", and the like are intended to have disjunctive meanings, and these phrases "at least one of A, B, and C", "at least one of A, B, or C", and the like also include examples where there may be one or more of each of A, B, and/or C (e.g., any combination of one or more of each of A, B, and C), unless the corresponding description and embodiment necessitates such listings (e.g., "at least one of A, B, and C") to be interpreted to have a conjunctive meaning.

The same name may be used to describe an element included in the examples described above and an element having a common function. Unless otherwise mentioned, the descriptions of the examples may be applicable to the following examples and thus, duplicated descriptions will be omitted for conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application. The use of the term "may" herein with respect to an example or embodiment, e.g., as to what an example or embodiment may include or implement, means that at least one example or embodiment exists where such a feature is included or implemented, while all examples are not limited thereto.

FIG. 1 illustrates an example of a homomorphic encryption operation apparatus.

Referring to FIG. 1, a homomorphic encryption operation apparatus 10 may perform encryption and decryption using homomorphic encryption. The homomorphic encryption operation apparatus 10 may perform a blind rotation operation for a homomorphic encryption operation. The homomorphic encryption operation apparatus 10 of one or more embodiments may reduce the size of a public key, thereby improving homomorphic encryption technology by reducing the amount of computation of the homomorphic encryption.

The homomorphic encryption operation apparatus 10 may generate an operation result by performing a homomorphic encryption operation. The homomorphic encryption operation apparatus 10 may generate a ciphertext (e.g., an operand ciphertext) for performing a blind rotation operation. The homomorphic encryption operation apparatus 10 may generate a secret key and a public key. The public key may include a key-switching key, a blind rotation key, and/or an automorphism key.

The homomorphic encryption operation apparatus 10 may perform a blind rotation operation using the generated secret key, ciphertext, and/or blind rotation key.

Homomorphic encryption may refer to a method of encryption configured to allow various operations to be performed on data as being encrypted. In homomorphic encryption, a result of an operation using ciphertexts may become a new ciphertext, and a plaintext obtained (e.g., determined or generated) by decrypting the ciphertext may be the same as an operation result of the original data before the encryption.

Hereinafter, encrypted data or encrypted text may be referred to as a ciphertext. The ciphertext may be in the form of a polynomial or a vector including a polynomial.

The homomorphic encryption operation apparatus 10 may perform a ring learning with errors (RLWE) problem-based homomorphic encryption operation that supports an operation on a ciphertext into which a plaintext including a binary number is encrypted. The homomorphic encryption operation apparatus 10 may perform an RLWE problem-based homomorphic encryption operation that supports an operation on a ciphertext into which a plaintext including an integer is encrypted. The homomorphic encryption operation apparatus 10 may perform an RLWE problem-based approximate homomorphic encryption operation that supports an operation on a ciphertext into which a plaintext including a real number and/or a complex number is encrypted.

The homomorphic encryption operation apparatus 10 may derive the same result as one obtained from an operation performed on the data of a plaintext by decrypting a result obtained from an operation on the data in an encrypted state using homomorphic encryption.

The homomorphic encryption operation apparatus 10 may perform an operation on a ciphertext, and may perform a blind rotation operation (e.g., a lookup table (LUT) operation) and key generation. The homomorphic encryption operation apparatus 10 may perform an operation on a non-polynomial function using the blind rotation method in homomorphic encryption.

The homomorphic encryption operation apparatus 10 may perform an encryption process of encrypting input data in privacy-preserving machine learning (PPML) and application services. The homomorphic encryption operation apparatus 10 may be used in an encryption process of encrypting an input value in PPML and application services.

The homomorphic encryption operation apparatus 10 of one or more embodiments may improve homomorphic encryption technology by eliminating limitations to space for storing a secret key, thereby adjusting the size of a vector of a secret key and increasing cryptographic safety in homomorphic encryption and application services using homomorphic encryption.

The homomorphic encryption operation apparatus 10 may adjust a storage space for storing a key (e.g., a secret key, a key-switching key, an automorphism key, or a blind rotation key) that is used by a server and a client and an amount of computation for a homomorphic encryption operation.

The homomorphic encryption operation apparatus 10 may be implemented in the form of a chip and mounted on a hardware accelerator that utilizes homomorphic encryption. The homomorphic encryption operation apparatus 10 may be implemented in the form of a chip or a chip implementing software to reduce memory usage of various operation apparatuses. The homomorphic encryption operation apparatus 10 of one or more embodiments may improve homomorphic encryption technology by reducing the amount of computation for the homomorphic encryption operation, thereby reducing the overall amount of computation of the server.

The homomorphic encryption operation apparatus 10 of one or more embodiments may improve homomorphic encryption technology by providing high cryptographic stability by adjusting the size of the vector of the secret key. The homomorphic encryption operation apparatus 10 may perform encryption on input data of the homomorphic encryption operation.

The homomorphic encryption operation apparatus 10 may be, or be implemented in, a personal computer (PC), a data server, and/or a portable device.

The portable device may be, or be implemented in, a laptop computer, a mobile phone, a smart phone, a tablet PC, a mobile internet device (MID), a personal digital assistant (PDA), an enterprise digital assistant (EDA), a digital still camera, a digital video camera, a portable multimedia player (PMP), a personal navigation device or portable navigation device (PND), a handheld game console, an e-book, a smart device, a smart watch, a smart band, and/or a smart ring.

The homomorphic encryption operation apparatus 10 may include a receiver 100 and a processor 200 (e.g., one or more processors). The homomorphic encryption operation apparatus 10 may further include the memory 300 (e.g., one or more memories).

The receiver 100 may include a receiving interface. The receiver 100 may receive data for performing a homomorphic encryption operation from the outside or from the memory 300. The data may be operand data (e.g., an operand ciphertext) or a key (e.g., a secret key, a key-switching key, an automorphism key, and/or a blind rotation key) for performing a homomorphic encryption operation.

The blind rotation key may be generated based on a ring Gentry, Sahai, Waters (RGSW) ciphertext or a ring learning with errors' (RLWE') ciphertext. The key-switching key may be generated based on the RLWE' ciphertext. The operand ciphertext may be generated based on a learning with errors (LWE) ciphertext.

The receiver 100 may receive a public key for performing a blind rotation operation and an operand ciphertext of the blind rotation operation. The public key may include a blind rotation key, an automorphism key, and a key-switching key. The receiver 100 may output the received public key and operand ciphertext to the processor 200.

The processor 200 may process data stored in the memory 300. The processor 200 may execute a computer-readable instructions stored in the memory 300 and instructions triggered by the processor 200.

The "processor 200" may be a data processing hardware device including a circuit having a physical structure to perform desired operations. For example, the desired operations may include code or instructions included in a program.

The data processing hardware device may include, for example, a microprocessor, a central processing unit (CPU), a processor core, a multi-core processor, a multiprocessor, an application-specific integrated circuit (ASIC), and/or a field-programmable gate array (FPGA).

The processor 200 may generate a modified vector by preprocessing vector components of the operand ciphertext based on an order of a polynomial of an output ciphertext of the blind rotation operation and a modulus of the operand ciphertext.

The processor 200 may compare the order of the output ciphertext with the modulus of the operand ciphertext. The processor 200 may generate the modified vector based on a result of the comparing.

The processor 200 may generate a first set based on a portion of the vector components of the operand ciphertext. The processor 200 may generate the modified vector based on a second set, wherein the first set and the second set are disjoint.

The processor 200 may generate a homomorphic encryption operation result by performing the blind rotation operation based on the public key and the modified vector. The public key may be generated based on the modified vector and a secret key.

When a generator of the vector components of the operand ciphertext is unique, the processor 200 may determine a loop index based on the generator. The processor 200 may perform the blind rotation operation based on the loop index.

The processor 200 may perform a first blind operation based on the first set of the operand ciphertext. The processor 200 may perform a second blind operation based on the second set of the operand ciphertext.

The processor 200 may perform the blind rotation operation by performing an increment operation, an automorphism operation, and a key switching operation based on the modified vector.

The processor 200 may obtain the number of odd numbers and the number of even numbers in the vector components of the operand ciphertext. The processor 200 may add "1" to the vector components of the operand ciphertext based on a result of comparing the number of odd numbers and the number of even numbers.

When the vector components of the operand ciphertext are even, the processor 200 may perform the blind rotation operation based on a blind rotation key based on vector components of a secret key of the public key, a negative sum of the vector components of the secret key, and a sum of consecutive vector components among the vector components of the secret key.

The memory 300 may store instructions (or programs) executable by the processor 200. For example, the instructions may include instructions for performing the operation of the processor 200 and/or an operation of each component of the processor 200. For example, the memory 300 may include a non-transitory computer-readable storage medium storing instructions that, when executed by the processor 200, configure the processor 200 to perform any one, any combination, or all of the operations and/or methods described herein with reference to FIGS. 1-8.

The memory 300 may be implemented as a volatile or non-volatile memory device.

The volatile memory device may be implemented as a dynamic random-access memory (DRAM), a static random-access memory (SRAM), a thyristor RAM (T-RAM), a zero capacitor RAM (Z-RAM), and/or a twin transistor RAM (TTRAM).

The non-volatile memory device may be implemented as an electrically erasable programmable read-only memory (EEPROM), a flash memory, a magnetic RAM (MRAM), a spin-transfer torque (STT)-MRAM, a conductive bridging RAM (CBRAM), a ferroelectric RAM (FeRAM), a phase change RAM (PRAM), a resistive RAM (RRAM), a nanotube RRAM, a polymer RAM (PoRAM), a nano floating gate Memory (NFGM), a holographic memory, a molecular electronic memory device), and/or an insulator resistance change memory.

Figure 2:
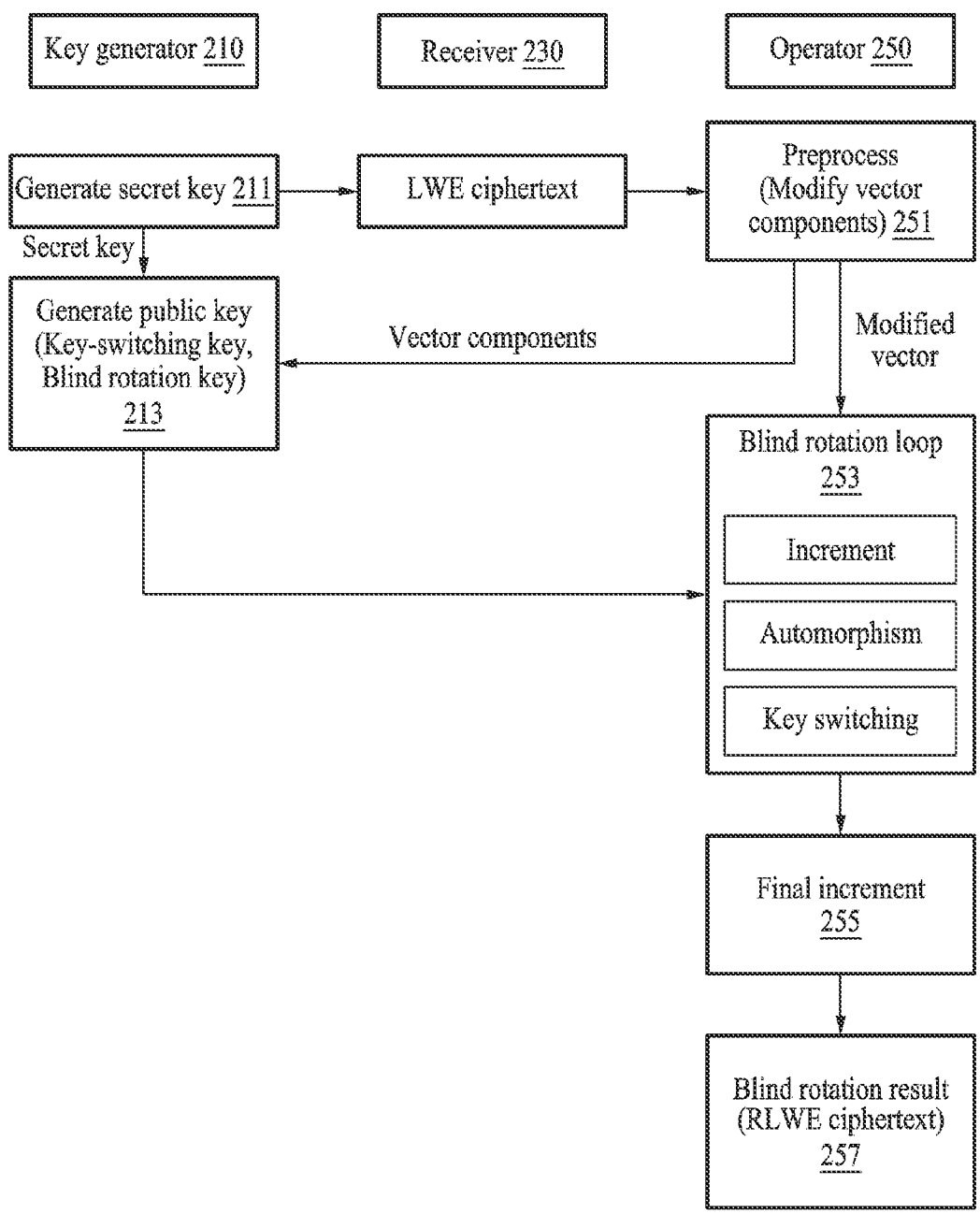
FIG. 2 illustrates an example of implementation of a homomorphic encryption operation apparatus.

FIG. 2 illustrates an example of an operation of a homomorphic encryption operation apparatus (e.g., the homomorphic encryption operation apparatus of FIG. 1).

Referring to FIG. 2, a ciphertext used by a processor (e.g., the processor 200 of FIG. 1) for a homomorphic encryption operation may be defined as follows.

In an LWE ciphertext, a ciphertext of a message (or a plaintext) m may be expressed as $(\beta, \vec{\alpha}) \in Z_q^{n+1}$. The ciphertext may be decrypted as expressed by $\beta + \Sigma_{i=0}^{n-1} \alpha_i s_i = m + e$ (mod q). $LWE_{\vec{s}}(m)$ may denote encryption of the message m using a secret key $\vec{s}$.

In an RLWE ciphertext, a ciphertext of the message m may be expressed as $(a,b) \in R_Q^2$. The ciphertext may be decrypted as expressed by $a \cdot z + b = m + e \pmod{Q}$. $RLWE_z(m)$ may denote encryption of the message m using a secret key z.

An RLWE ciphertext of the message m using the secret key z may be defined as expressed by Equation 1 below, for example.

$$RLWE(m) = (a, a \cdot z + e + m) \qquad \text{Equation 1:}$$

Here, a denotes a polynomial on a modulus Q, and e denotes an error polynomial with a small coefficient. When each encryption is performed, a and e may be generated at random.

An RLWE' ciphertext of the message m for a secret key s may be defined as expressed by Equation 2 below, for example.

$$RLWE'(m) = (RLWE(g_0 \cdot m), RLWE(g_1 \cdot m), \ldots,$$
$$RLWE(g_{d-1} \cdot m)) \qquad \text{Equation 2:}$$

Here, $(g_0, g_1, \ldots, g_{d-1})$ may be a vector defined in advance for decomposing an arbitrary integer, and may be set in the form of $(1, B, B^2, \ldots, B^{d-1})$ for an arbitrary integer B or in the form of $(\overline{Q}_0 \cdot [\overline{Q}_0^{-1}]_{q_0}, \ldots, \overline{Q}_{d-1} \cdot [\overline{Q}_{d-1}^{-1}]_{q_{d-1}})$ for $\overline{Q}_i = Q/q_i$.

An RGSW ciphertext of the message m for the secret key z may be defined by two RLWE' ciphertexts as expressed by Equation 3 below, for example.

$$RGSW(m) = (RLWE'(-zm), RLWE'(m)) \qquad \text{Equation 3:}$$

Homomorphic encryption operations performed by the processor 200 may be defined as follows.

In an automorphism operation of an RLWE ciphertext, automorphism $\psi_t$ of a polynomial ring may output $a(X^t)$ with respect to an element $a(X)$ of the polynomial ring, and the space of the domain and the space of the codomain may be the same. In the RLWE ciphertext, the processor 200 may output $(a(X^t), b(X^t)) \in R_Q^2$ with respect to an input $(a(X), b(X)) \in R_Q^2$ through the automorphism operation.

The processor 200 may obtain a ciphertext corresponding to a new secret key $z_2$ from a ciphertext corresponding to a secret key $z_1$ through a key switching operation. The processor 200 may obtain a new ciphertext $a \odot RLWE'_{z_2}(s_1) + (0, b) = (a_2, b_2) \in R_Q^2$ with $z_2$ as a secret key using a key-switching key $RLWE'_{z_2}(z_1)$, which is a public key, with respect to the input ciphertext $RLWE_{z_1}(u) = (a_1, b_1) \in R_Q^2$.

The processor 200 may perform a blind rotation operation. The processor 200 may perform a blind rotation operation with respect to the ciphertext $(\beta, \vec{\alpha}) \in Z_q^{n+1}$ and an arbitrary function $f(X) \in R_Q$ using a blind rotation key, and output $$RLWE_{Q,z}\left(f \cdot Y^{\beta + \sum_{i=0}^{n-1} \alpha_i s_i}\right) = RLWE_{Q,z}\left(f \cdot X^{\frac{2N}{q}(\beta + \sum_{i=0}^{n-1} \alpha_i s_i)}\right).$$

An odd generator on integers may be defined as follows. $\mathbb{Z}_q$, which is a ring of integers modulo q, may be integers from "0" to "q−1", and may define addition and multiplication.

$\mathbb{Z}^*_q$ may be a subset of the ring of integers modulo q, having inverse elements for multiplication. $\mathbb{Z}^*_q$ may be a set having inverse elements for multiplication, in the subset of $\mathbb{Z}_q$. If $\mathbb{Z}^*_q$ is expressible by powers of $g_i$s, then $g_i$s may be referred to as generators of $\mathbb{Z}^*_q$.

The processor 200 may generally consider a case where q is a power of "2". In this case, $\mathbb{Z}^*_q$ may have a set of all odd numbers that are less than or equal to q and coprime with "2". When q is a power of "2", all of the odd numbers may be expressed by powers of "5" and "−1". For example, an odd number may be expressed as $\mathbb{Z}^*_q = \langle 5, -1 \rangle$. Thus, the odd number may be expressed as $\mathbb{Z}^*_q = \{\pm 5^k : k = 0, \ldots, q/4 - 1\}$.

A disjoint family of sets may refer to two sets having no elements in common. If components $\alpha_i$ of arbitrary vector $\vec{\alpha}$ having a power of "2" as a modulus are divided into $I_j^+ = \{\alpha_i : \alpha_i = g^j\}$ and $I_j^- = \{\alpha_i : \alpha_i = -g^j\}$, $I_j^+$ and $I_j^-$ may be a disjoint family of sets.

The processor 200 may calculate (e.g., determine) $\beta + \sum_{i=0}^{n-1} \alpha_i s_i$ from an LWE ciphertext $(\beta, \vec{\alpha}) \in Z_q^{n+1}$, which is an operand ciphertext, using a blind rotation key, thereby performing a blind rotation operation of calculating an operation result of a message to which a function f is applied in $$RLWE_{Q,z}\left(f \cdot X^{\frac{2N}{q}(\beta + \sum_{i=0}^{n-1} \alpha_i s_i)}\right) = RLWE_{Q,z}\left(f \cdot X^{\left(\frac{2N}{q}\beta + \sum_{i=0}^{n-1} \frac{2N}{q} \alpha_i s_i\right)}\right).$$

The processor 200 of one or more embodiments may improve homomorphic encryption technology by reducing the size of a public key and the amount of computation used for the process of the blind rotation operation.

The processor 200 may perform the blind rotation operation using $ak_g$ and $ak_{-g}$ only according to a result of comparing the modulus q and 2N based on an order of an RLWE ciphertext, with the key-switching key not having $ak_t$ for all odd numbers t.

The processor 200 may generate a blind rotation key and a key-switching key, by comparing 2N based on a vector component $\alpha_i$ of $\vec{\alpha}$ of the LWE ciphertext, the modulus q, and the order of the RLWE ciphertext by performing a preprocessing process.

In the process of performing the blind rotation operation, the processor 200 may generate a modified vector $\vec{\omega}$ based on a comparison between the modulus q which is the range of vector components of $\vec{\alpha}$ and vector components of the LWE ciphertext and 2N which is twice the order of the RLWE ciphertext.

The processor 200 may update the RLWE ciphertext by performing an automorphism operation, an increment operation, and a key switching operation based on the properties of components $\omega_i$ of the modified vector.

When an additional operation is used according to the value of the modified vector $\vec{\omega}$ that is generated in the preprocessing process, the processor 200 may update the RLWE ciphertext by performing the increment operation.

The processor 200 may output $$RLWE_{Q,z}\left(f \cdot X^{\frac{2N}{q}(\beta + \sum_{i=0}^{n-1} \alpha_i s_i)}\right) = RLWE_{Q,s}\left(f \cdot X^{\left(\frac{2N}{q}\beta + \sum_{i=0}^{n-1} \frac{2N}{q} \alpha_i s_i\right)}\right)$$

as a homomorphic encryption operation result.

The processor 200 may include an operator 250. A key generator 210 and the operator 250 may be implemented on different devices, as a non-limiting example. For example, the key generator 210 may be implemented on a client, and the operator 250 may be implemented on a server.

In an example, the processor 200 may include the operator 250 and not include the key generator 210. However, in some examples, the processor 200 may include the key generator 210.

In operation 211, the key generator 210 may generate a secret key. In operation 213, the key generator 210 may generate a public key based on the secret key. The public key may include a key-switching key or a blind rotation key. The key generator 210 may generate a secret key for an LWE ciphertext and an RLWE ciphertext. The key generator 210 may generate an LWE ciphertext based on the generated secret key.

The key generator 210 may output the generated public key to a receiver 230 and/or the operator 250. The key generator 210 may transmit the generated public key wirelessly or wired.

The receiver 230 may be, include, and/or operate in the same manner as the receiver 100 of FIG. 1. The receiver 230 may receive an operand ciphertext (e.g., an LWE ciphertext) and output the same to the operator 250.

The operator 250 may generate a modified vector by preprocessing the operand ciphertext. The operator 200 may receive an LWE ciphertext $(\beta, \vec{\alpha}) \in Z_q^{n+1}$ and perform a blind rotation operation. The operator 200 may calculate an operation result of a message with respect to a function f using $$RLWE_{Q,s}\left(f \cdot X^{\frac{2N}{q}(\beta + \sum_{i=0}^{n-1} \alpha_i s_i)}\right).$$

In operation 251, the operator 250 may generate the modified vector by performing preprocessing based on the LWE ciphertext. The operator 250 may output the modified vector to the key generator 210.

The key generator 210 may compare and analyze 2N based on each vector component $\alpha_i$ of a vector $\vec{\alpha}$ of the LWE ciphertext $(\beta, \vec{\alpha})$, a modulus q, and an order of an RLWE ciphertext.

The key generator 210 may verify a generator for generating a comparison and analysis result $\alpha_i$, generate a blind rotation key and a key-switching key necessary as a result of the verifying, and transmit the blind rotation key and the key-switching key to the operator 250.

In operation 253, the operator 250 may repeatedly perform a blind rotation operation based on the public key received from the key generator 210. The operator 250 may perform an increment operation, an automorphism operation, and a key switching operation.

The operator 250 may divide components $\omega_i$ of the modified vector $\vec{\omega}$ into a first set and a second set that are disjoint. The first set may be $I_j^+ = \{\omega_i : \omega_i = g^j\}$, and the second set may be $I_j^- = \{\omega_i : \omega_i = -g^j\}$. The operator 250 may perform a blind rotation operation on the vector components in $$I_{\frac{N}{2}-1},$$

perform a blind rotation operation on the vector components corresponding to $I_j^-$, and then perform a blind rotation operation on the vector components corresponding to $I_j^+$. The operations may be performed in a different order according to examples. The process of a blind rotation operation will be described in detail with reference to FIGS. 3 to 6.

In operation 255, the operator 250 may perform a final increment operation on a portion caused by a difference between the vector $\vec{\alpha}$ and the modified vector $\vec{\omega}$. The operator 250 may output an RLWE ciphertext $$RLWE_{Q,z}\left(f(X) \cdot X^{\frac{2N}{q}(\beta + \sum_{i=0}^{n-1} \alpha_i s_i)}\right)$$

as a final operation result.

Figure 3:
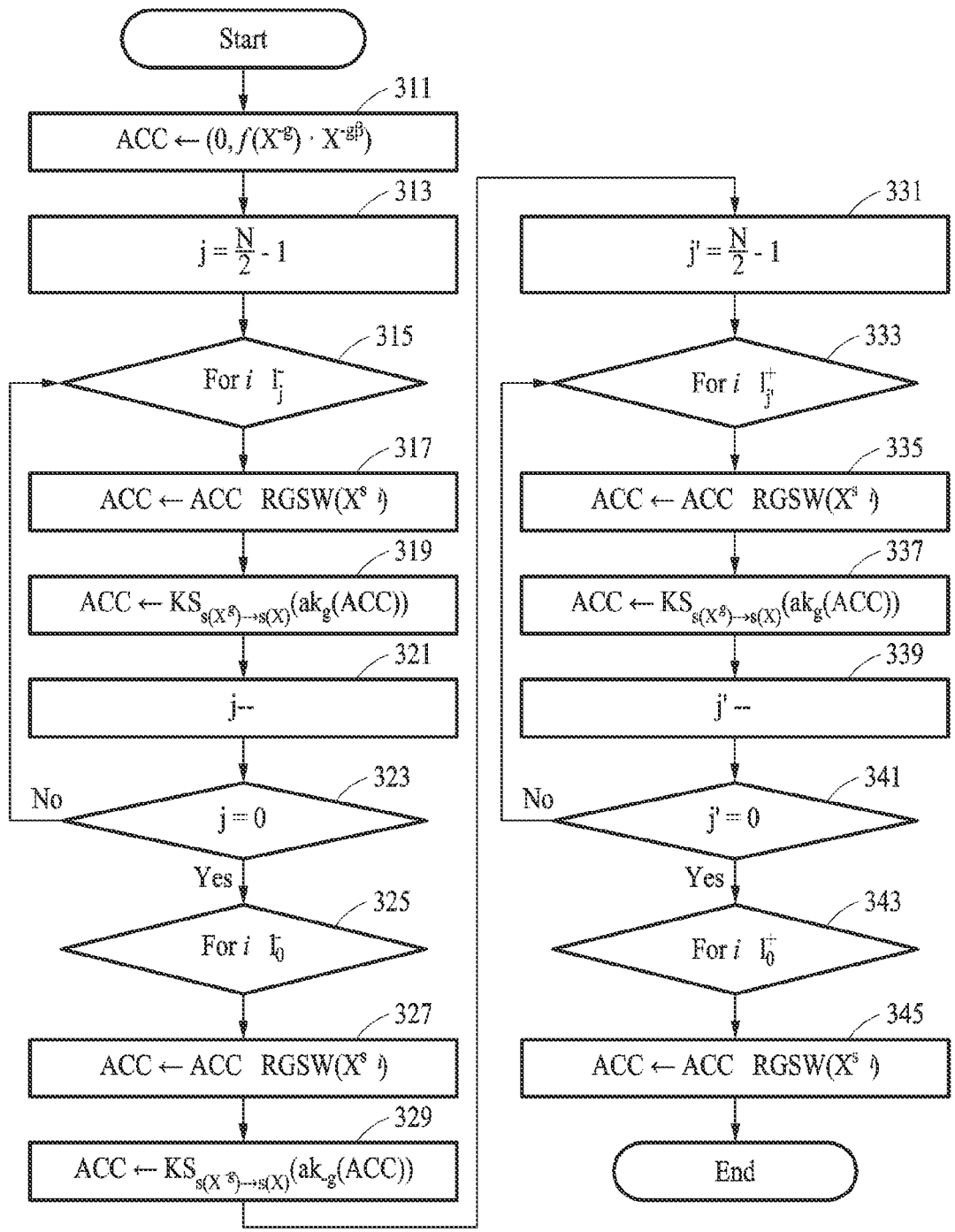
FIGS. 3 to 6 illustrate examples of homomorphic encryption operations of a homomorphic encryption operation apparatus.

FIG. 3 illustrates an example of a homomorphic encryption operation of a homomorphic encryption operation apparatus (e.g., the homomorphic encryption operation apparatus of FIG. 1). Operations 311 through 345 of FIG. 3 may be performed sequentially but not necessarily performed sequentially. For example, the order of the operations 311 through 345 may change and two or more of the operations 311 through 345 may be performed in parallel or simultaneously. Further, one or more of operations 311 through 345 may be omitted, without departing from the spirit and scope of the shown example.

Referring to FIG. 3, the example of FIG. 3 shows a process of a blind rotation operation when all vector components of a given LWE ciphertext are odd.

A key generator (e.g., the key generator 210 of FIG. 2) may generate an input LWE ciphertext as $(\beta, \vec{\alpha})$. The key generator 210 may generate a blind rotation key $RGSW(X^{s_i})$ which is an RGSW ciphertext corresponding to each secret key. The key generator 210 may generate automorphism keys $ak_g$ and $ak_{-g}$ corresponding to g and $-g$. The key generator 210 may generate a key-switching key for changing $s(X^{-g})$ to $s(X)$. The key generator 210 may output the generated LWE ciphertext, the blind rotation key, the automorphism keys, and the key-switching key to an operator (e.g., the operator 250 of FIG. 2).

In operation 311, the operator 250 may set an initial value. The operator 250 may set the initial value in the form of a ring element.

The operator 250 may divide components $\omega_i$ of a modified vector into $I_j^+ = \{\omega_i : \omega_i = g^j\}$ and $I_j^- = \{\omega_i : \omega_i = -g^j\}$. In operation 313, the operator 250 may set $$j = \frac{N}{2} - 1$$

to perform a blind rotation operation on vector components in $$I_{\frac{N}{2}-1}.$$

In operation 315, the operator 250 may perform a loop of a blind rotation operation for i that satisfies $I_j^-$. In operation 317, the operator 250 may perform an increment operation on RGSW. In operation 319, the operator 250 may perform an automorphism operation on g, and perform a key switching operation for restoring the secret key to the original secret key.

The operator 250 may verify that operations 313 to 319 have been performed for all $I_j^-$, excluding j=0, through operations 321 and 323.

In operation 325, the operator 250 may perform the loop of the blind rotation operation for i that satisfies $I_0^-$. In operation 327, the operator 250 may perform an increment operation for vector components of $I_0^-$. In operation 329, the operator 250 may perform an automorphism operation on $-g$, and perform a key switching operation for restoring the secret key to the original secret key.

In operation 331, the operator 250 may set $$j' = \frac{N}{2} - 1.$$

In operation 333, the operator 250 may perform the loop of the blind rotation operation for i that satisfies $I_j^+$. In operation 335, the operator 250 may perform an increment operation for vector components of $I_j^+$. In operation 337, the operator 250 may perform an automorphism operation on $-g$, and perform a key switching operation for restoring the secret key to the original secret key.

The operator 250 may verify that operations 313 to 319 have been performed for all $I_j^+$, excluding j'=0, through operations 339 and 341. The operator 250 may perform an increment operation through operations 343 and 345 and output an RLWE ciphertext as a blind rotation operation result.

Using the example of FIG. 3, when the vector component of the LWE ciphertext is odd regardless of the size of the vector components, a homomorphic encryption operation apparatus (e.g., the homomorphic encryption operation apparatus 10 of FIG. 1) of one or more embodiments may improve homomorphic encryption technology by performing a homomorphic encryption operation by minimizing the number of automorphism keys and key-switching keys using automorphism during the blind rotation operation.

Figure 4:
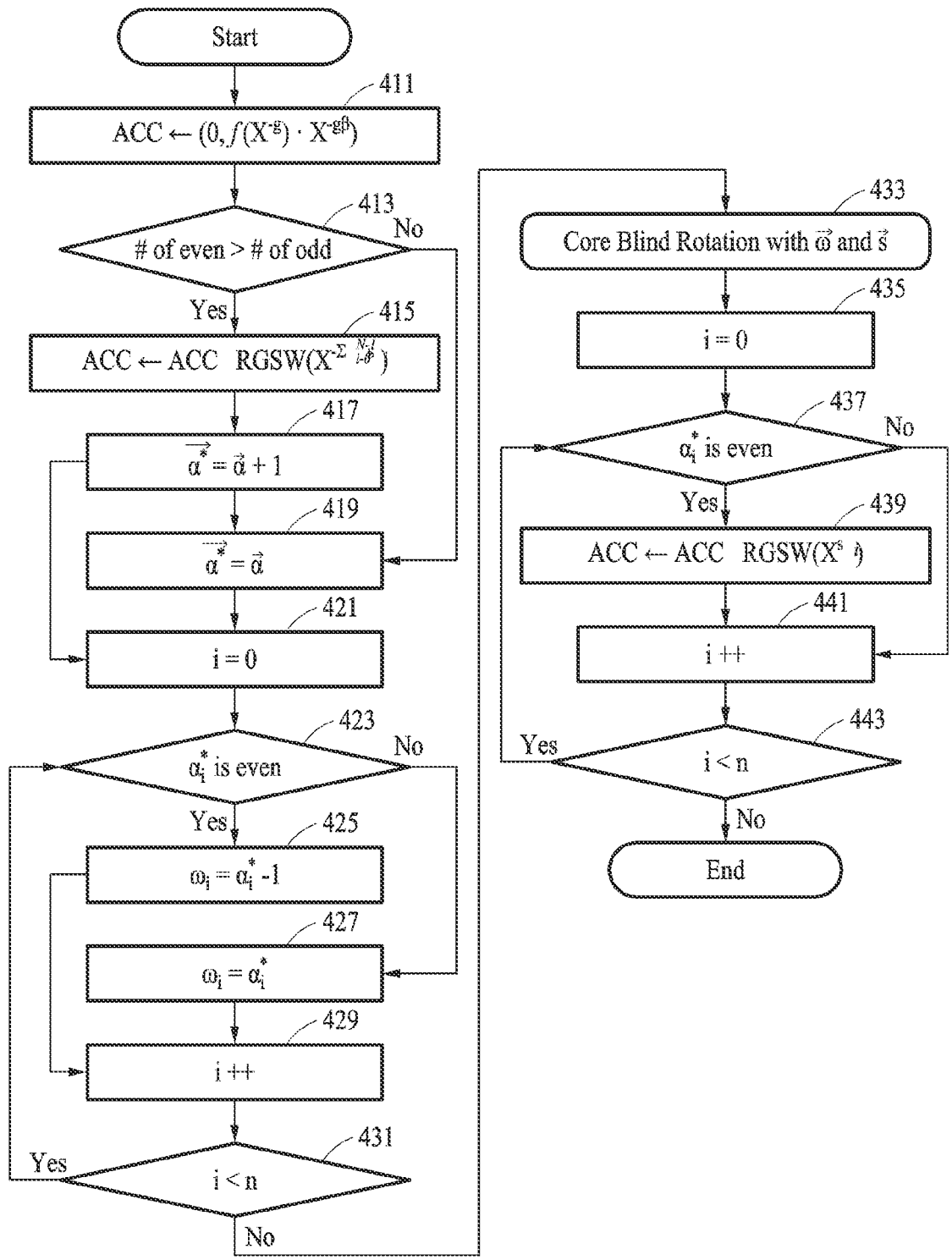

FIG. 4 illustrates an example of a homomorphic encryption operation of a homomorphic encryption operation apparatus (e.g., the homomorphic encryption operation apparatus of FIG. 1). Operations 411 through 443 of FIG. 4 may be performed sequentially but not necessarily performed sequentially. For example, the order of the operations 411 through 443 may change and two or more of the operations 411 through 443 may be performed in parallel or simultaneously. Further, one or more of the operations 411 through 443 may be omitted, without departing from the spirit and scope of the shown example.

Referring to FIG. 4, a process of a blind rotation operation when an LWE ciphertext $(\beta, \vec{\alpha})$ includes vector components that are even is shown.

A key generator (e.g., the key generator 210 of FIG. 2) may generate an input LWE ciphertext as $(\beta, \vec{\alpha})$. The key generator 210 may generate a blind rotation key $RGSW(X^J)$ which is an RGSW ciphertext corresponding to each secret key. The key generator 210 may generate, as the blind rotation key, an RGSW ciphertext $RGSW(X^{-\Sigma s_i})$ corresponding to the negative sum of vector components of the secret key.

The key generator 210 may generate automorphism keys $ak_g$ and $ak_{-g}$ corresponding to g and $-g$. The key generator 210 may generate a key-switching key for changing $s(X^{-g})$ to $s(X)$. The key generator 210 may output the generated LWE ciphertext, the blind rotation key, the automorphism keys, and the key-switching key to an operator (e.g., the operator 250 of FIG. 2).

In operation 411, the operator 250 may set an initial value. The operator 250 may set the initial value in the form of a ring element. In operation 413, the operator 250 may obtain and compare the number of odd numbers and the number of even numbers among vector components of an operand ciphertext.

When the number of even numbers is greater, the operator 250 may perform an increment operation using $RGSW(X^{-\Sigma s_i})$, in operation 415. In operation 417, the operator 250 may change the LWE ciphertext $(\beta, \vec{\alpha})$ to $(\beta, \vec{\alpha}+1)$.

When the number of odd numbers is greater, the operator 250 may maintain the LWE ciphertext in its original form, in operation 419. In operation 421, the operator 250 may set i=0. In operation 423, starting from i=0, the operator 250 may verify whether vector components are even for i that satisfies i<n.

When the vector components are even, the operator 250 may generate a modified vector based on $\alpha^*_i - 1$, in operation 425. When the vector components are odd, the operator 250 may generate a modified vector based on a $\alpha^*_i$, in operation 427. In operation 429, the operator 250 may increase i. In operation 431, the operator 250 may determine if i<n. The operator 250 may generate a modified vector $\vec{\omega}$ of which all vector components are odd, through operations 423 to 431.

In operation 433, the operator 250 may perform a blind rotation operation based on the modified vector $\vec{\omega}$ and the secret key $\vec{s}$. The process of performing the blind rotation operation may be the same as that of FIG. 3.

When the vector components of the LWE operation are even, the operator 250 may additionally perform an increment operation of the RGSW ciphertext, through operations 435 to 443. In operation 435, the operator 250 may determine whether $\alpha^*_i$ is even. If even, the operator 250 may perform an increment operation of $RGSW(X^{s_i})$, in operation 439. In operation 441, the operator 250 may increase i. In operation 443, the operator 250 may determine if i<n. If $\alpha^*_i$ is odd, the operator 250 may perform operation 443.

The operator 250 may output an RLWE ciphertext as a final operation result.

Using the example of FIG. 4, when an even number is included in the vector components of the LWE ciphertext, the operator 250 of one or more embodiments may improve homomorphic encryption technology by efficiently using a storage space of a memory by adding only one blind rotation operation key. The operator 250 may perform an increment operation using the RGSW ciphertext $$\frac{N}{2} + 1$$

times at the maximum, thereby adjusting a trade-off relationship between the memory and the operation.

Figure 5:
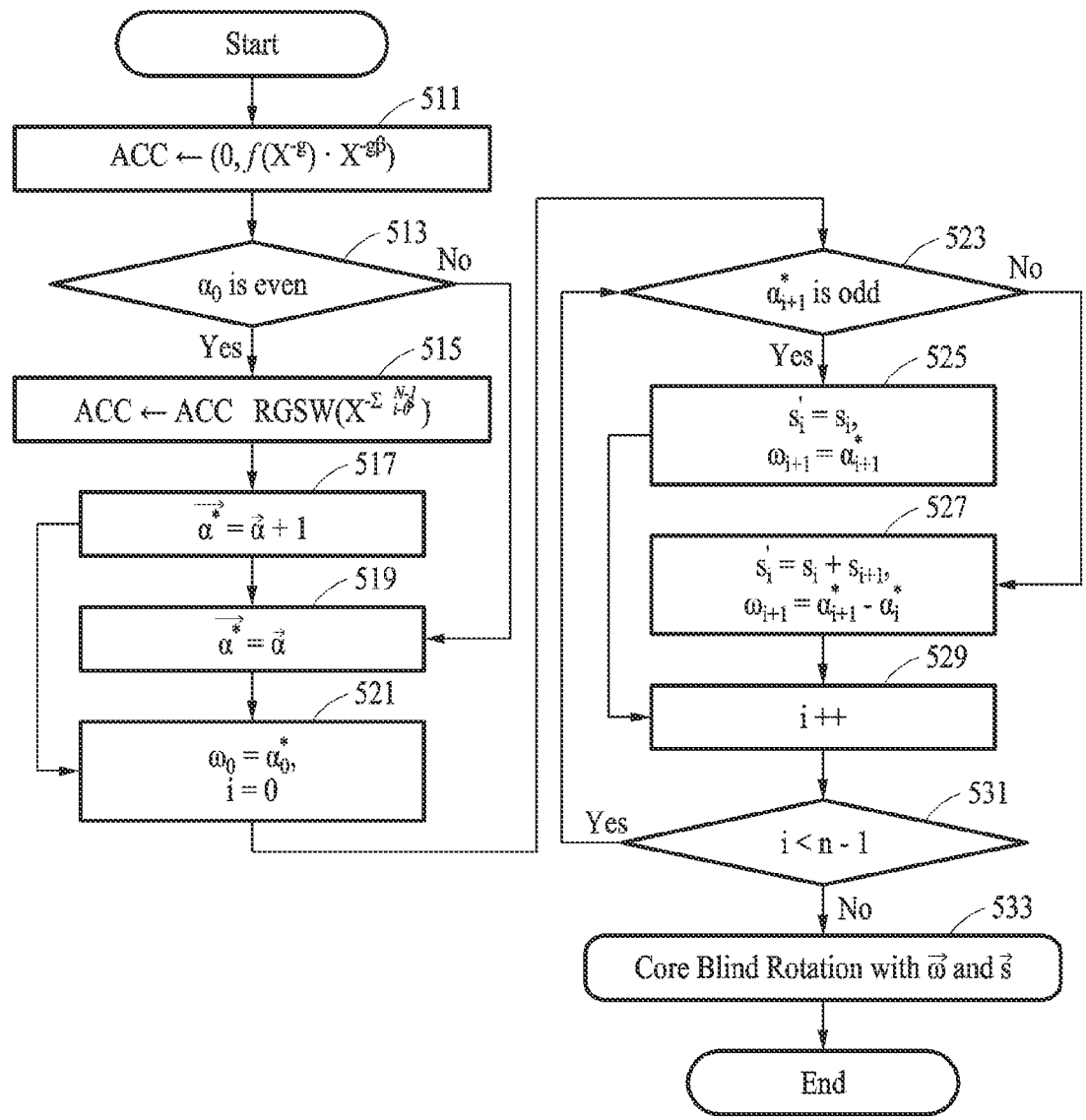

FIG. 5 illustrates an example of a homomorphic encryption operation of a homomorphic encryption operation apparatus (e.g., the homomorphic encryption operation apparatus of FIG. 1). Operations 511 through 533 of FIG. 5 may be performed sequentially but not necessarily performed sequentially. For example, the order of the operations 511 through 533 may change and two or more of the operations 511 through 533 may be performed in parallel or simultaneously. Further, one or more of the operations 511 through 533 may be omitted, without departing from the spirit and scope of the shown example.

Referring to FIG. 5, the example of FIG. 5 shows a process of a blind rotation operation when an even component is included in vector components of an LWE ciphertext.

A key generator (e.g., the key generator 210 of FIG. 2) may generate an input LWE ciphertext as $(\beta, \vec{\alpha})$. The key generator 210 may generate a blind rotation key RGSW($X^{s_i}$) which is an RGSW ciphertext corresponding to each secret key. The key generator 210 may generate, as the blind rotation key, an RGSW ciphertext RGSW($X^{-\Sigma_i}$) corresponding to the negative sum of vector components of the secret key. The key generator 210 may generate, as a blind rotation key, an RGSW ciphertext RGSW($X^{s_i+s_{i+1}}$) based on the sum of consecutive vector components.

The key generator 210 may generate automorphism keys $ak_g$ and $ak_{-g}$ corresponding to g and -g. The key generator 210 may generate a key-switching key for changing s($X^{-g}$) to s(X). The key generator 210 may output the generated LWE ciphertext, the blind rotation key, the automorphism keys, and the key-switching key to an operator (e.g., the operator 250 of FIG. 2).

In operation 511, the operator 250 may set an initial value. The operator 250 may set the initial value in the form of a ring element. In operation 513, the operator 250 may determine whether a first component of the vector components of the LWE ciphertext is even.

When the first component is even, the operator 250 may perform an increment operation using RGSW($X^{-\Sigma s_i}$), in operation 515. In operation 517, the operator 250 may change the LWE ciphertext $(\beta, \vec{\alpha})$ to $(\beta, \vec{\alpha}+1)$. When the first component is odd, the operator 250 may maintain the LWE ciphertext in its original form, in operation 519.

The operator 250 may perform operations 521 to 531 to change the vector components of the LWE ciphertext into values appropriate for an automorphism operation. In operation 521, the operator 250 may start an operation from i=0.

In operation 523, the operator 250 may determine whether the vector components $\alpha^*_{i+1}$ are odd. When odd, the operator 250 may set a secret key vector and a modified vector as s'$_i$=s$_i$ and $\omega_{i+1}=\alpha^*_{i+1}$, respectively, in operation 525.

When even, the operator 250 may set a secret key vector and a modified vector as s'$_i$=s$_i$+s$_{i+1}$ and $\omega_{i+1}=\alpha^*_{i+1}-\alpha^*_i$, respectively, in operation 527.

In operation 529, the operator 250 may increase i. In operation 531, the operator 250 may determine if i<n-1. When the condition of operation 531 is not satisfied, the operator 250 may perform a blind rotation operation using the modified vector $\vec{\omega}$ and a new secret key vector $\vec{s}'$. The blind rotation operation may be performed in the same manner as described in FIG. 3.

The operator 250 may output an RLWE ciphertext as a final operation result.

Using the example of FIG. 5, when an even number is included in the vector components of the LWE ciphertext, the operator 250 may additionally perform an increment operation using the RGSW ciphertext only once, depending on whether the first vector component is odd. Accordingly, the operator 250 of one or more embodiments may improve homomorphic encryption technology by efficiently performing the homomorphic encryption operation by reducing the amount of computation. At this time, N+1 additional blind rotation keys may be generated, and thus, a trade-off may occur between the memory and the amount of computation.

Figure 6:
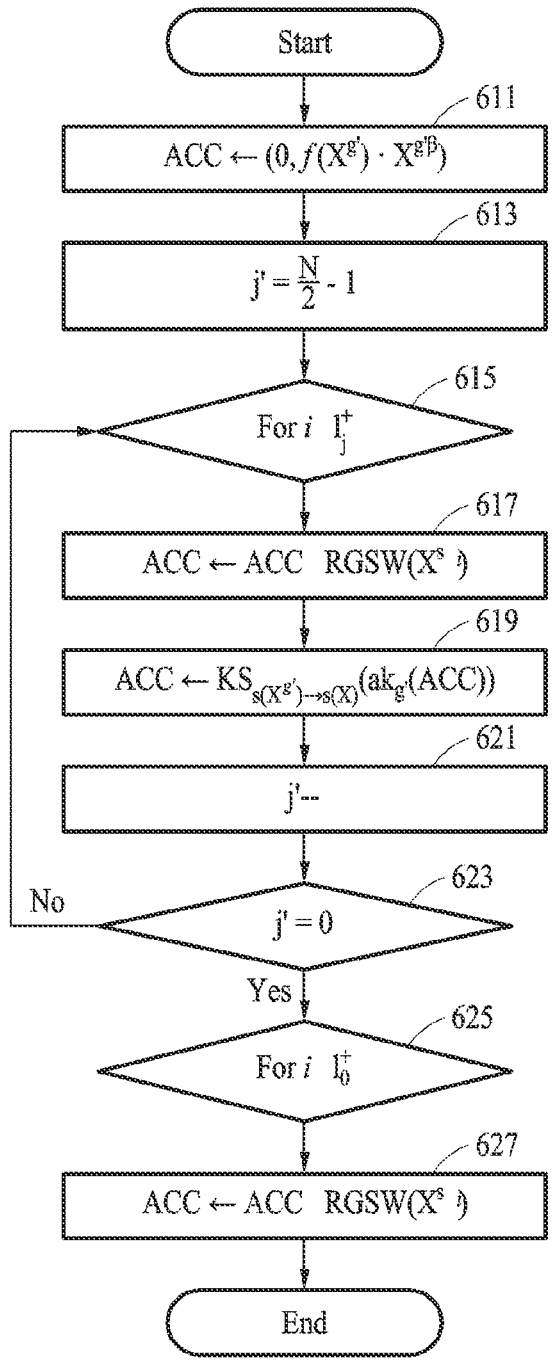

FIG. 6 illustrates an example of a homomorphic encryption operation of a homomorphic encryption operation apparatus (e.g., the homomorphic encryption operation apparatus of FIG. 1). Operations 611 through 627 of FIG. 6 may be performed sequentially but not necessarily performed sequentially. For example, the order of the operations 611 through 627 may change and two or more of the operations 611 through 627 may be performed in parallel or simultaneously. Further, one or more of the operations 611 through 627 may be omitted, without departing from the spirit and scope of the shown example.

Referring to FIG. 6, the example of FIG. 6 shows a case of $$q < \frac{N}{2}$$

or a case where a generator for generating vector components of an LWE ciphertext is unique as g', when a blind rotation operation is performed. In this case, all vector components may have a remainder of "1" when divided by "4", may have a form of $g'^k$, and may not have a form of a negative number.

A key generator (e.g., the key generator 210 of FIG. 2) may generate an input LWE ciphertext as $(\beta, \vec{\alpha})$. The key generator 210 may generate a blind rotation key RGSW($X^I$) which is an RGSW ciphertext corresponding to each secret key. The key generator 210 may generate $ak_{g'}$ and a key-switching key for changing s($X^{g'}$) to s(X). The key generator 210 may output the generated LWE ciphertext, the blind rotation key, the automorphism keys, and the key-switching key to an operator (e.g., the operator 250 of FIG. 2).

In operation 611, the operator 250 may set an initial value. The operator 250 may set the initial value in the form of a ring element. In operation 613, the operator 250 may divide each vector component $\omega_i$ by $I_j^+=\{\omega_i:\omega_i=g'^j\}$, and set j=ord-1 to start a blind rotation operation from the vector components in $I_{ord-1}^+$. Ord may denote the smallest positive integer that satisfies $g'^{ord}=1$.

In operation 615, the operator 250 may perform a blind rotation operation for all components in $I_j^+$. In operation 617, the operator 250 may perform an increment operation on RGSW. In operation 619, the operator 250 may perform an automorphism operation on g', and perform a key switching operation for restoring the secret key to the original secret key.

The operator 250 may verify whether operations 615 to 619 have been performed for all $I_j^+$, excluding j=0, through operations 621 and 623.

In operation 627, the operator 250 may perform an increment operation for all vector components of $I_0^+$ through operation 625. The operator 250 may output an RLWE ciphertext as a blind rotation operation result.

A homomorphic encryption operation apparatus (e.g., the homomorphic encryption operation apparatus 10 of FIG. 1) of one or more embodiments may apply the example of FIG. 6 according to the vector components of the LWE ciphertext or parameter values of homomorphic encryption, thereby improving homomorphic encryption technology by efficiently performing a homomorphic encryption operation using only one automorphism key.

As another example, when the operator 250 divides the vector components of the LWE ciphertext into $I_j^+=\{\alpha_i: \alpha_i=g^j\}$ and $I_j^-=\{\alpha_i:\alpha_i=-g^j\}$, both $I_j^+$ and $I_j^-$ may be empty sets for some j. In this case, the operator 250 of one or more embodiments may generate and use a plurality of automorphism keys for generators, thereby improving homomorphic encryption technology by reducing the number of times a blind rotation operation is unnecessarily performed. For example, the operator 250 may generate $ak_g, \ldots, ak_{g^b}$, and $ak_{-g}$ as automorphism keys. The example of generating a plurality of automorphism keys may apply to all of the examples of FIGS. 3 to 6.

Figure 7:
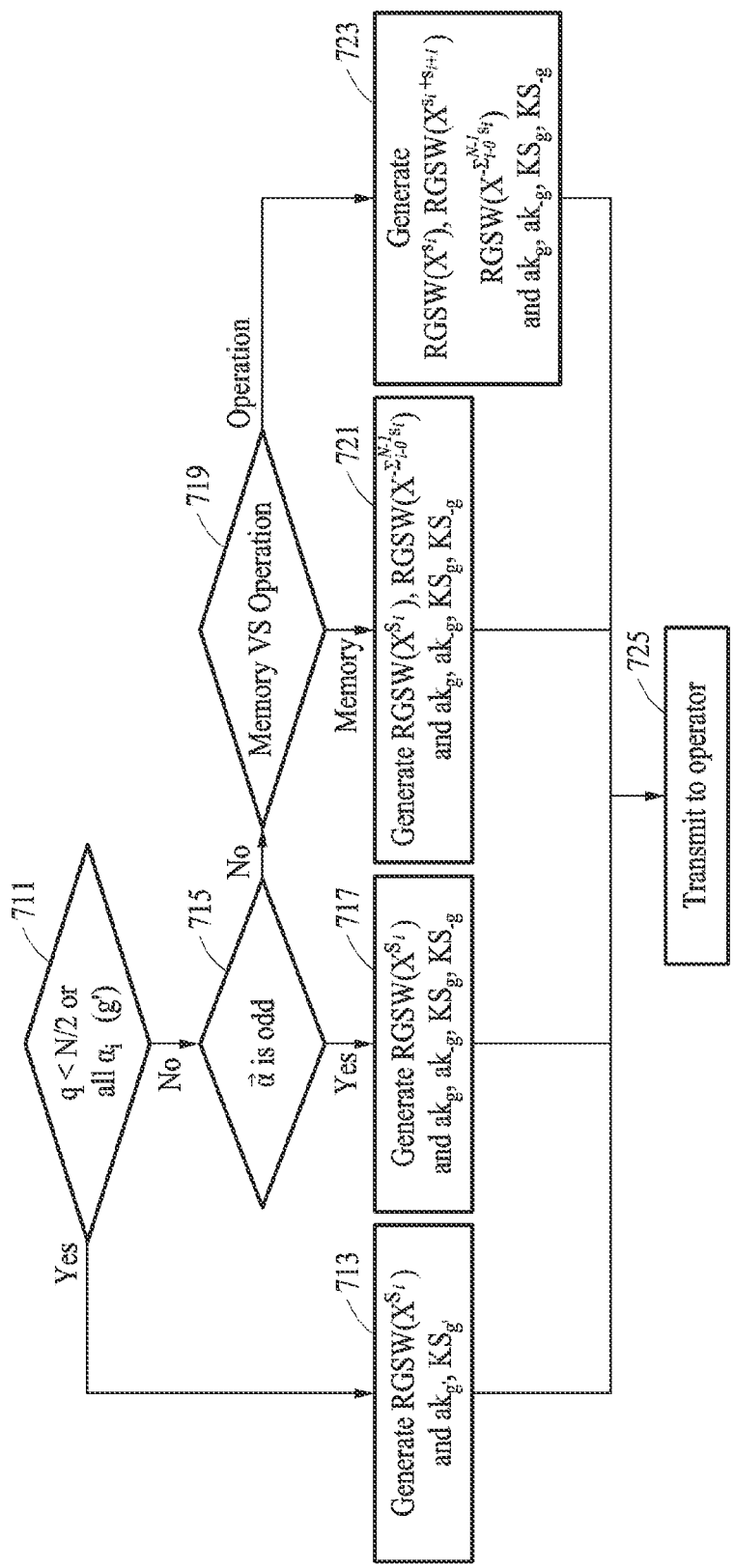
FIG. 7 illustrates an example of a key generation operation of a homomorphic encryption operation apparatus.

FIG. 7 illustrates an example of a key generation operation of a homomorphic encryption operation apparatus (e.g., the homomorphic encryption operation apparatus of FIG. 1). Operations 711 through 725 of FIG. 7 may be performed sequentially but not necessarily performed sequentially. For example, the order of the operations 711 through 725 may change and two or more of the operations 711 through 725 may be performed in parallel or simultaneously. Further, one or more of the operations 711 through 725 may be omitted, without departing from the spirit and scope of the shown example.

Referring to FIG. 7, in a case of $$q < \frac{N}{2}$$

or a case where a generator for generating vector components of an operand ciphertext (e.g., an LWE ciphertext) ($\beta$, $\vec{\alpha}$) is unique as g', a key generator (e.g., the key generator 210 of FIG. 2) may generate $RGSW(X^{s_i})$ and $ak_{g'}$ based on the value of the generator g' for generating the vector components of the LWE ciphertext and generate a key-switching key for changing $s(X^{g'})$ to $s(X)$, to perform the blind rotation operation shown in the example of FIG. 6.

In operation 711, the key generator 250 may determine if $$q < \frac{N}{2}$$

or whether the generator is unique as g'. When the condition of operation 711 is satisfied, the key generator 250 may generate $RGSW(X^I)$ and $ak_{g'}$ and generate the key-switching key for changing $s(X^{g'})$ to $s(X)$, in operation 713. In operation 725, the key generator 250 may transmit the public keys generated in operation 713 to an operator (e.g., the operator 250 of FIG. 2).

When the generator is not unique, the key generator 250 may determine whether an even number is included in the vector components, and generate the public key as in the example of FIG. 3. Alternatively or additionally, the key generator 250 may determine the importance of memory efficiency and computational efficiency, generate a public key as in the examples of FIGS. 4 and 5, and transmit the public key to the operator 250.

When the condition of operation 711 is not satisfied, the key generator 250 may determine whether $\vec{\alpha}$ is odd, in operation 715. When $\vec{\alpha}$ is odd, the key generator 250 may generate $RGSW(X^{s_i})$, $ak_g$, and $ak_{-g}$, in operation 717. In operation 725, the key generator 250 may transmit the public keys generated in operation 717 to the operator 250.

When $\vec{\alpha}$ is even, the key generator 250 may select one having a higher importance between the memory efficiency and the computational efficiency, in operation 719. When the importance of the memory efficiency is high, the key generator 250 may generate blind rotation keys $RGSW(X^I)$ and $RGSW(X^{-\Sigma I})$, and generate automorphism keys $ak_g$ and $ak_{-g}$, in operation 721. In operation 725, the key generator 250 may transmit the public keys generated in operation 721 to the operator 250.

When the importance of the computational efficiency is high, the key generator 250 may generate blind rotation keys $RGSW(X^I)$, $RGSW(X^{-\Sigma s_i})$, and $RGSW(X^I)$, and generate automorphism keys $ak_g$ and $ak_{-g}$, in operation 723. In operation 725, the key generator 250 may transmit the public keys generated in operation 723 to the operator 250.

Figure 8:
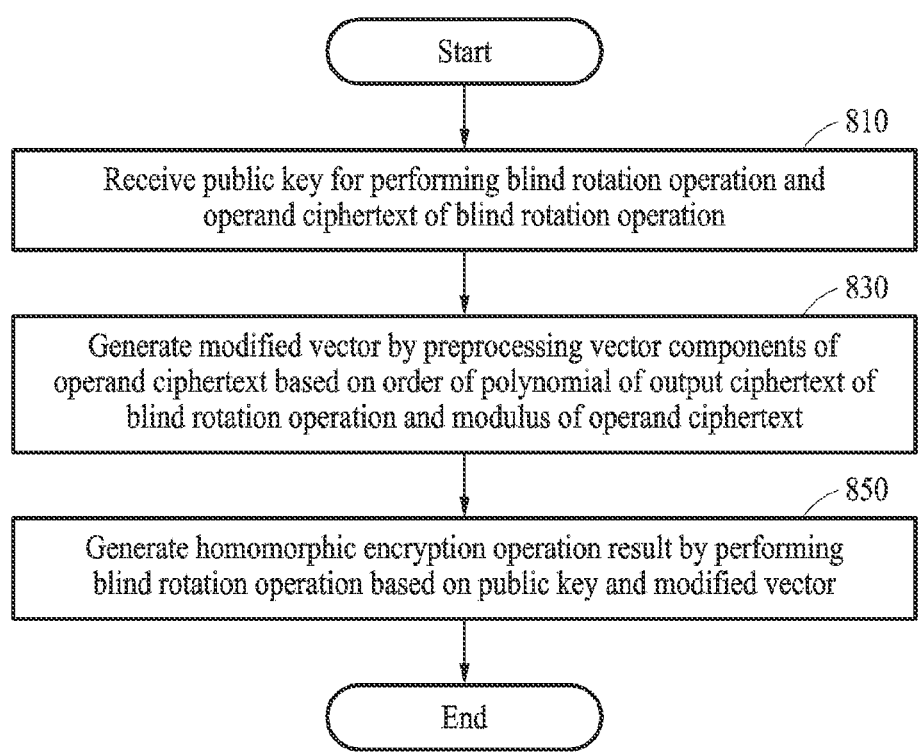
FIG. 8 illustrates an example of an operation of a homomorphic encryption operation apparatus.

FIG. 8 illustrates an example of an operation of a homomorphic encryption operation apparatus (e.g., the homomorphic encryption operation apparatus of FIG. 1). Operations 810 through 850 of FIG. 8 may be performed sequentially but not necessarily performed sequentially. For example, the order of the operations 810 through 850 may change and two or more of the operations 810 through 850 may be performed in parallel or simultaneously. Further, one or more of the operations 810 through 850 may be omitted, without departing from the spirit and scope of the shown example.

Referring to FIG. 8, in operation 810, a receiver (e.g., the receiver 100 of FIG. 1) may receive a public key for performing a blind rotation operation and an operand ciphertext of the blind rotation operation. The public key may include a blind rotation key, an automorphism key, and a key-switching key.

In operation 830, the processor 200 may generate a modified vector by preprocessing vector components of the operand ciphertext based on an order of a polynomial of an output ciphertext of the blind rotation operation and a modulus of the operand ciphertext.

The processor 200 may compare the order of the output ciphertext with the modulus of the operand ciphertext. The processor 200 may generate the modified vector based on a result of the comparing.

The processor 200 may generate a first set based on a portion of the vector components of the operand ciphertext. The processor 200 may generate the modified vector based on a second set, wherein the first set and the second set are disjoint.

In operation 850, the processor 200 may generate a homomorphic encryption operation result by performing the blind rotation operation based on the public key and the modified vector. The public key may be generated based on the modified vector and a secret key.

When a generator of the vector components of the operand ciphertext is unique, the processor 200 may determine a loop index based on the generator. The processor 200 may perform the blind rotation operation based on the loop index.

The processor 200 may perform a first blind operation based on the first set of the operand ciphertext. The processor 200 may perform a second blind operation based on the second set of the operand ciphertext.

The processor 200 may perform the blind rotation operation by performing an increment operation, an automorphism operation, and a key switching operation based on the modified vector.

The processor 200 may obtain the number of odd numbers and the number of even numbers in the vector components of the operand ciphertext. The processor 200 may add "1" to the vector components of the operand ciphertext based on a result of comparing the number of odd numbers and the number of even numbers.

When the vector components of the operand ciphertext are even, the processor 200 may perform the blind rotation operation based on a blind rotation key based on vector components of a secret key of the public key, a negative sum of the vector components of the secret key, and a sum of consecutive vector components among the vector components of the secret key.

The homomorphic encryption operation apparatuses, receivers, processors, memories, key generators, receivers, operators, homomorphic encryption operation apparatus 10, receiver 100, processor 200, memory 300, key generator 210, receiver 230, operator 250, and other apparatuses, devices, units, modules, and components disclosed and described herein with respect to FIGS. 1-8 are implemented by or representative of hardware components. As described above, or in addition to the descriptions above, examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. As described above, or in addition to the descriptions above, example hardware components may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-8 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media, and thus, not a signal per se. As described above, or in addition to the descriptions above, examples of a non-transitory computer-readable storage medium include one or more of any of read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above and all drawing disclosures, the scope of the disclosure is also inclusive of the claims and their equivalents, i.e., all variations within the scope of the claims and their equivalents are to be construed as being included in the disclosure.

What is claimed is:

1. An apparatus with a homomorphic encryption operation, the apparatus comprising:
   one or more processors configured to:
   generate a modified vector by preprocessing vector components of an operand ciphertext of a blind rotation operation based on an order of a polynomial of an output ciphertext of the blind rotation operation and a modulus of the operand ciphertext; and
   generate a homomorphic encryption operation result by performing the blind rotation operation based on a public key for performing the blind rotation operation and the modified vector.

2. The apparatus of claim 1, wherein the public key comprises a blind rotation key, an automorphism key, and a key-switching key.

3. The apparatus of claim 1, wherein the public key is generated based on the modified vector and a secret key.

4. The apparatus of claim 1, wherein, for the generating of the modified vector, the one or more processors are configured to:
   compare the modulus and the order of the output ciphertext; and
   generate the modified vector based on a result of the comparing.

5. The apparatus of claim 1, wherein, for the generating of the modified vector, the one or more processors are configured to:
   generate a first set based on a portion of the vector components of the operand ciphertext; and
   generate the modified vector based on a second set, wherein the first set and the second set are disjoint.

6. The apparatus of claim 1, wherein, for the generating of the homomorphic encryption operation result, the one or more processors are configured to:
   determine, in response to a generator of the vector components of the operand ciphertext being unique, a loop index based on the generator; and
   perform the blind rotation operation based on the loop index.

7. The apparatus of claim 1, wherein, for the generating of the homomorphic encryption operation result, the one or more processors are configured to:
   perform a first blind operation based on a first set of the operand ciphertext; and
   perform a second blind operation based on a second set of the operand ciphertext.

8. The apparatus of claim 1, wherein, for the generating of the homomorphic encryption operation result, the one or more processors are configured to perform the blind rotation operation by performing an increment operation, an automorphism operation, and a key switching operation based on the modified vector.

9. The apparatus of claim 1, wherein, for the generating of the homomorphic encryption operation result, the one or more processors are configured to:
   determine a number of odd numbers and a number of even numbers in the vector components of the operand ciphertext; and
   add "1" to the vector components of the operand ciphertext based on a result of comparing the number of odd numbers and the number of even numbers.

10. The apparatus of claim 1, wherein, for the generating of the homomorphic encryption operation result, the one or more processors are configured to, in response to the vector components of the operand ciphertext being even, perform the blind rotation operation based on a blind rotation key based on vector components of a secret key of the public key, a negative sum of the vector components of the secret key, and a sum of consecutive vector components among the vector components of the secret key.

11. The apparatus of claim 1, further comprising a receiver configured to receive the public key and the operand ciphertext.

12. A processor-implemented method with a homomorphic encryption operation, the method comprising:
    generating a modified vector by preprocessing vector components of an operand ciphertext of a blind rotation operation based on an order of a polynomial of an output ciphertext of the blind rotation operation and a modulus of the operand ciphertext; and
    generating a homomorphic encryption operation result by performing the blind rotation operation on the modified vector based on a public key for performing the blind rotation operation.

13. The method of claim 12, wherein the public key comprises a blind rotation key, an automorphism key, and a key-switching key.

14. The method of claim 12, wherein the public key is generated based on the modified vector and a secret key.

15. The method of claim 12, wherein the generating of the modified vector comprises:
    comparing the modulus and the order of the output ciphertext; and
    generating the modified vector based on a result of the comparing.

16. The method of claim 12, wherein the generating of the modified vector comprises:
    generating a first set based on a portion of the vector components of the operand ciphertext; and
    generating the modified vector based on a second set, wherein the first set and the second set are disjoint.

17. The method of claim 12, wherein the generating of the homomorphic encryption operation result comprises:
    determining, in response to a generator of the vector components of the operand ciphertext being unique, a loop index based on the generator; and
    performing the blind rotation operation based on the loop index.

18. The method of claim 12, wherein the generating of the homomorphic encryption operation result comprises:
- performing a first blind operation based on a first set of the operand ciphertext; and
- performing a second blind operation based on a second set of the operand ciphertext.

19. The method of claim 12, wherein the generating of the homomorphic encryption operation result comprises performing the blind rotation operation by performing an increment operation, an automorphism operation, and a key switching operation based on the modified vector.

20. The method of claim 12, wherein the generating of the homomorphic encryption operation result comprises:
- determining a number of odd numbers and a number of even numbers in the vector components of the operand ciphertext; and
- adding "1" to the vector components of the operand ciphertext based on a result of comparing the number of odd numbers and the number of even numbers.

21. The method of claim 12, wherein the generating of the homomorphic encryption operation result comprises performing, in response to the vector components of the operand ciphertext being even, the blind rotation operation based on a blind rotation key based on vector components of a secret key of the public key, a negative sum of the vector components of the secret key, and a sum of consecutive vector components among the vector components of the secret key.

\* \* \* \* \*